(12) United States Patent
Kuzuo et al.

(10) Patent No.: US 9,059,461 B2
(45) Date of Patent: Jun. 16, 2015

(54) COATED NICKEL HYDROXIDE POWDER AS CATHODE ACTIVE MATERIAL FOR ALKALINE SECONDARY BATTERY AND METHOD FOR PRODUCING SAME

(71) Applicants: Ryuichi Kuzuo, Ehime (JP); Minoru Shiraoka, Ehime (JP)

(72) Inventors: Ryuichi Kuzuo, Ehime (JP); Minoru Shiraoka, Ehime (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 14/043,932

(22) Filed: Oct. 2, 2013

(65) Prior Publication Data

US 2014/0106227 A1 Apr. 17, 2014

Related U.S. Application Data

(62) Division of application No. 13/356,154, filed on Jan. 23, 2012, now Pat. No. 8,603,677.

(51) Int. Cl.
*H01M 4/36* (2006.01)
*H01M 4/52* (2010.01)

(52) U.S. Cl.
CPC ............. *H01M 4/366* (2013.01); *H01M 4/52* (2013.01)

(58) Field of Classification Search
None
See application file for complete search history.

(56) References Cited

U.S. PATENT DOCUMENTS

2005/0238960 A1* 10/2005 Nakamura et al. ............ 429/223
2010/0068624 A1*  3/2010 Hiratsuka et al. ............. 429/223
2012/0276454 A1* 11/2012 Mori et al. .................... 429/223

FOREIGN PATENT DOCUMENTS

| JP | 63152866 | 6/1988 |
| JP | 07133115 | 5/1995 |
| JP | 2000077070 | 3/2000 |
| JP | 200149941 | 5/2000 |
| JP | 2002029755 | 1/2002 |
| JP | 201171125 | 4/2011 |

OTHER PUBLICATIONS

English Abstract of JP63152866, Jun. 1998.
English Abstract of JP07133115, May 1995.
English Abstract of JP2000149941, May 2000.
English Abstract of JP2000077070, Mar. 2000.
English Abstract of JP2002029755, Jan. 2002.
English Abstract of JP 201171125, Apr. 2011.

* cited by examiner

*Primary Examiner* — Patrick Ryan
*Assistant Examiner* — Christopher Domone
(74) *Attorney, Agent, or Firm* — Dykema Gossett PLLC

(57) ABSTRACT

A coated nickel hydroxide powder suitable as a cathode active material for alkaline secondary battery includes nickel hydroxide powder particles which have a coating layer thereon of preferably cobalt hydroxide or cobalt oxyhydroxide.

2 Claims, 1 Drawing Sheet

COATED NICKEL HYDROXIDE POWDER AS CATHODE ACTIVE MATERIAL FOR ALKALINE SECONDARY BATTERY AND METHOD FOR PRODUCING SAME

CROSS-REFERENCE TO RELATED APPLICATION

This application is a division of U.S. application Ser. No. 13/356,154, filed Jan. 23, 2012, now U.S. Pat. No. 8,603,677.

TECHNICAL FIELD

The present invention relates to a nickel hydroxide powder as a cathode active material for alkaline secondary battery and a method for producing the same. More particularly, the present invention relates to a nickel hydroxide ponder coated with a cobalt compound to ensure conductivity between particles thereof to enhance the utilization ratio, lifetime characteristics, and output characteristics of batteries and a method for producing the same.

BACKGROUND

With recent development of portable devices, there has been a strong demand for higher-capacity secondary batteries for use in such devices. A nickel hydroxide ponder as a cathode material for alkaline secondary battery has also been improved by dissolving cobalt as a solid solution therein to improve a high-temperature utilization ratio or by dissolving zinc or magnesium as a solid solution therein to improve lifetime characteristics.

Further, alkaline secondary bat aeries have come to be used as high-output power sources such as power sources for hybrid cars, and therefore there has been a strong demand not only for such an improvement in a high-temperature utilization ratio or lifetime characteristics but also for an improvement in output characteristics. However, a nickel hydroxide powder as a cathode material for alkaline secondary battery is an electrical insulating material and poor in conductivity, and therefore has a problem that electric current is not sufficiently distributed to nickel hydroxide and therefore the electrochemical availability of nickel hydroxide is low.

In order to solve such a problem, a cobalt compound such as cobalt oxide or cobalt hydroxide is added as a conductive material to ensure conductivity between nickel hydroxide particles. Such a cobalt compound added is dissolved in a high-concentration alkali metal hydroxide solution used as an electrolytic solution in an alkaline secondary battery, and is oxidized to cobalt oxyhydroxide curing electrical charge so that the cobalt oxyhydroxide is deposited on the surface of nickel hydroxide particles. As a result, electrical conductivity is developed and a conductive network is formed between the nickel hydroxide particles.

A cathode using a nickel hydroxide powder and such a cobalt compound as an additive is generally produced by filling the pores of a three-dimensional, metal porous body such as a foamed metal (made of nickel metal) with a paste obtained by mixing a nickel hydroxide powder and a cobalt compound powder together with a binder and then subjecting the three-dimensional metal porous body to drying and pressing. However, the cobalt compound powder mixed together with the binder is not necessarily dispersed well in the nickel hydroxide powder. Therefore, such a cathode has a problem that its utilization ratio is significantly lowered under the conditions of use during high-load electrical charge.

As a means for solving such a problem, a method for coating the surface of a nickel hydroxide powder with a cobalt compound has been proposed. For example, Japanese Patent Application Laid-Open (JP-A) No. 63-152866 proposes a nickel active material for storage battery mainly composed of nickel hydroxide particles having a β-type cobalt hydroxide thin layer formed thereon. JP-A No. 63-152866 describes that seen a nickel active material can be obtained by depositing a nickel hydroxide powder from a nickel salt in an aqueous alkali solution, and then immersing the nickel hydroxide powder in an aqueous solution of cobalt sulfate salt or cobalt nitrate salt, and then neutralizing the aqueous solution with an aqueous alkali solution.

Further, as a method for producing a cobalt hydroxide-coated nickel hydroxide powder, JP-A No. 7-133115 describes a method in which a cobalt-containing aqueous solution and an ammonium ion supplier are simultaneously, continuously, and quantitatively supplied to a nickel hydroxide powder-containing aqueous solution adjusted to pH 11 to 13 by a caustic alkali.

Further, JP-A No. 2000-149941 proposes a method in which a cobalt ion-containing aqueous solution is supplied to a suspension of a raw nickel hydroxide powder at a supply rate of 0.7 g/min or less in terms of cobalt per kilogram of the raw nickel hydroxide powder said an ammonium ion-containing aqueous solution is supplied to the suspension to achieve a nickel ion concentration of 10 to 50 mg/L and a cobalt ion concentration of 5 to 40 mg/L while the pH, temperature, and ammonium ion concentration of the suspension are kept at predetermined values.

All the methods disclosed in JP-A Nos. 63-152866, 7-133115, and 2000-149941 are intended to ensure the dispersibility and uniformity of a conductive cobalt, compound by previously coating the surface of nickel hydroxide powder particles with cobalt hydroxide. However, such conventional methods have a problem that a cobalt hydroxide coating layer is non-uniformly formed on the surface of nickel hydroxide particles or the coating layer is peeled off in the process of producing a paste and therefore it is difficult to ensure the uniformity of a conductive cobalt compound.

SUMMARY

In view of the circumstances, it is an object of the present invention to provide a method for producing a coated nickel hydroxide powder suitable as a cathode active material for alkaline secondary battery by ensuring the uniformity and adhesiveness of a cobalt hydroxide coating formed on the surface of nickel hydroxide powder particles in an aqueous solution.

In order to achieve the above object, the present inventors have intensively studied a method for coating the surface of nickel hydroxide particles with cobalt hydroxide, and as a result have found that the state of diffusion of an aqueous cobalt salt solution and an aqueous alkali solution in a suspension obtained by dispersing a nickel hydroxide powder in water has a major effect on the uniformity and adhesiveness of a cobalt hydroxide coating layer. In addition, she present inventors have fourth treat the state of diffusion of the aqueous cobalt salt solution and the aqueous alkali solution in the suspension can be controlled by adjusting the flow velocity of the suspension and the supply rates and supply positions of the aqueous cobalt salt solution and the aqueous alkali solution. These findings have led to the completion of the present invention.

That is, there is provided a method for producing a coated, nickel hydroxide powder as a cathode active material for alkaline secondary battery, the method including the steps of: dispersing a nickel hydroxide powder in water to prepare a suspension; and supplying an aqueous alkali solution to the suspension with stirring to keep a pH of the suspension at 8 or higher as measured at 25° C. and supplying an aqueous cobalt salt solution to the suspension to coat a surface of each of particles of the nickel hydroxide powder with cobalt hydroxide crystallized out by neutralization, wherein a ratio of a supply rate ρ (mol/sec) of a cobalt salt contained, in the aqueous cobalt salt solution to a product of a supply width d (cm) of the aqueous cobalt salt solution measured in a direction orthogonal to a direction of a flow of the suspension and a flow velocity v (cm/sec) of the suspension in a contact portion between a liquid surface of the suspension and the aqueous cobalt salt solution as a supply position of the aqueous cobalt salt solution, that is, $\rho/(d \times v)$ is $3.5 \times 10^{-4}$ mol/cm$^2$ or less.

This makes it possible to stably ensure the uniformity and adhesiveness of a cobalt hydroxide coating layer formed in the suspension to coat the surface of the nickel hydroxide powder, particles with cobalt hydroxide.

Further, there is provided a coated nickel, hydroxide powder as a cathode active material for alkaline secondary battery including nickel, hydroxide powder particles having a coating layer made of a cobalt compound on a surface thereof, wherein when 20 g of the coated nickel hydroxide powder and 50 mL of water placed in a closed conic leer are shaken by a shaker mixer for 1 hour, an amount of the cobalt compound coating layer peered off is 20 mass % or less of a total amount of the cobalt compound coating.

The coated nickel, hydroxide powder according to the present invention is capable of preventing its coating layer from being peeled off in the process of producing a paste by mixing with a binder or the like, and is therefore excellent as a cathode active material for alkaline secondary battery.

Further, the coated nickel hydroxide powder according to the present invention is not only capable of preventing its coating layer made of cobalt hydroxide or cobalt oxyhydroxide from being peeled off during the production of a paste but also has high conductivity, and is therefore suitable for use in a power source for electric car or hybrid car required to have high-output characteristics. Furthermore, such improved conductivity enhances a utilization ratio, and therefore the coated nickel hydroxide powder according to the present invention is very suitable for use in a power source for portable electric device required to nave a high capacity.

DETAILED DESCRIPTION OF DISCLOSED EMBODIMENTS

Figure 1:
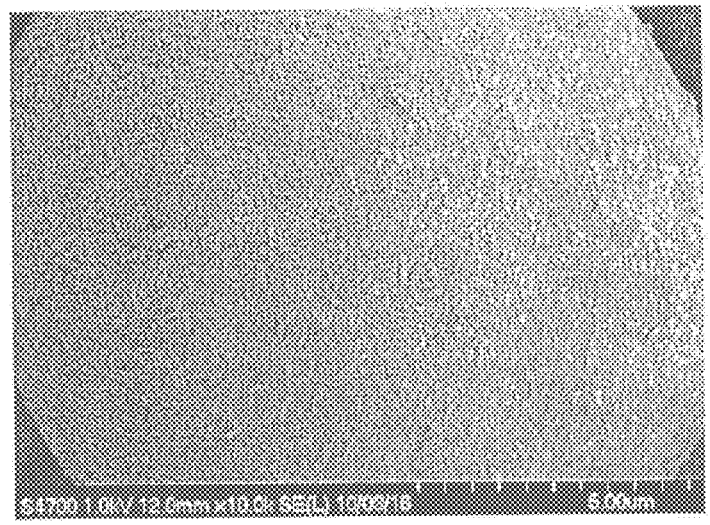
FIG. 1 is an SEC photograph of a cobalt oxyhydroxide-coated nickel hydroxide powder produced in Example 1.

Generally, in a method for producing a nickel hydroxide powder as a cathode active material for alkaline secondary battery, a suspension is prepared by dispersing a nickel hydroxide powder in water, and an aqueous cobalt salt solution and an aqueous alkali solution are added to the suspension with stirring to cause a crystallization reaction by neutralization to coat the surface of the nickel hydroxide powder with cobalt hydroxide crystallized out thereon by neutralization. In the case of such a method, cobalt is present in its ionic state in a low pH area, but cobalt hydroxide is started to be gradually deposited as pH increases. At this time, when nickel hydroxide particles are present near cobalt hydroxide, the cobalt hydroxide is deposited on the surface of the nickel hydroxide particles that are energetically more stable.

As a result of intensive study of such a deposition process of cobalt hydroxide, it has been found that when the concentration of cobalt ions rapidly increases and exceeds its critical super saturation that depends on the pH range of the suspension in which cobalt ions are present, cobalt hydroxide is deposited alone in water even when nickel hydroxide particles are not present near the cobalt hydroxide. However, when the pH of the suspension is low, specifically, less than 8, the deposition rate of cobalt hydroxide is low, and therefore cobalt hydroxide is not deposited alone even when the concentration of cobalt ions exceeds its critical super saturation.

On the other hand, when the pH of the suspension in which cobalt ions are present is 8 or higher, the critical supersaturation of the concentration of cobalt ions is lowered, and therefore, the concentration of cobalt ions easily exceeds its critical supersaturation when it increases. As a result, cobalt hydroxide is deposited alone without adhering to the surface of nickel hydroxide particles. Such cobalt hydroxide deposited alone adheres to the surface of nickel hydroxide particles when the resulting nickel hydroxide slurry is filtered. However, it has been found that, in this case, the cobalt hydroxide sparsely adheres to the surface of nickel hydroxide particles and is therefore poor in uniformity, and in addition, the cobalt hydroxide is very poor in adhesiveness because adhesion between the cobalt hydroxide and the nickel hydroxide particles is achieved simply by filtration.

Based on such a result of study of the deposition process of cobalt hydroxide, in a method according to an embodiment of she present invention, the pH (as measured at 25° C.) of a suspension of nickel hydroxide particles is controlled to fail within the range of 8 or higher and the concentration of cobalt ions in the suspension at the time when the pH of the suspension is within such a pH range is kept equal to or less than its upper limit at which cobalt hydroxide is not deposited alone in order to uniformly form cobalt hydroxide excellent in adhesiveness on the surface of the nickel hydroxide particles. According to such a method, cobalt hydroxide is deposited on the surface of the nickel hydroxide particles to match the surface structure of nickel hydroxide, and therefore a cobalt hydroxide coating excellent in adhesiveness is uniformly formed on the surface of the nickel hydroxide particles.

As described above, avoidance of the formation of a region where the concentration of cobalt ions is high is important to reliably deposit cobalt hydroxide excellent in uniformity and adhesiveness. This is achieved by reducing the ratio between the amount of the aqueous cobalt salt solution supplied per unit time and the amount of the suspension flowing into the supply position of the aqueous cobalt salt solution per unit time. More specifically, the supply rate of the aqueous cobalt salt solution is reduced to sufficiently quickly reduce the concentration of a cobalt salt even when the amount of the suspension flowing into the supply position per unit time is small, or the amount of the suspension flowing into the supply position per unit time is increased. This makes it possible to diffuse the aqueous cobalt salt solution supplied to the suspension as quickly as possible in the suspension for dilution to prevent the appearance of a region where the concentration of cobalt ions is extremely high in the suspension.

The amount of the suspension flowing into the supply position per unit time may be considered as the amount of the suspension flowing per unit time into a portion where the liquid surface of the suspension comes into contact with the supply flow of the aqueous cobalt salt solution continuously supplied to the liquid surface to be mixed with the suspension (hereinafter, this portion is referred to as a "contact portion with the aqueous cobalt salt solution" or simply referred to as a "contact portion"). In this case, initial diffusion is performed in an extremely short period of time, and therefore when the flow velocity of the suspension is sufficiently high, the contact portion can be considered as the liquid surface of the suspension that comes into contact with the supply flow of the aqueous cobalt salt solution per unit time.

More specifically, the amount of the suspension flowing into the supply position per unit time can be considered as the product of a length measured in a direction orthogonal to the direction of the flow of the suspension in the contact portion with the aqueous cobalt salt solution (hereinafter, this length is referred to as a "supply width d of the aqueous cobalt salt solution") and a flow velocity v of the suspension in the contact portion. It is to be noted that when the aqueous cobalt salt solution is supplied through, for example, a circular tube treat is open to the liquid surface of the suspension and therefore the contact portion with the aqueous cobalt salt solution on the liquid surface of the suspension is circular, the supply width d of the aqueous cobalt salt solution measured in a direction orthogonal to the direction of the flow of the suspension may be considered as a diameter of the circular contact portion. The surface flow velocity of the suspension can easily be determined by simulation even when it is difficult to actually measure the flow velocity.

Therefore, in the method according to the embodiment, of the present invention, the ratio of a supply rate $\rho$ (mol/sec) of a cobalt salt contained, in the aqueous cobalt salt solution to the product of the supply width d (cm) of the aqueous cobalt salt solution measured in a direction orthogonal to the direction of the flow of the suspension and the flow velocity v (cm/sec) of the suspension in the contact portion with the aqueous cobalt salt, solution, that is, $\rho/(d \times v)$ is made small. More specifically, the ratio needs to be $3.5 \times 10^{-1}$ mol/cm$^2$ or less, preferably $2.0 \times 10^{-4}$ mol/cm$^2$ or less. If the ratio $\rho/(d \times v)$ exceeds $3.5 \times 10^{-4}$ mol/cm$^2$, a region where the concentration of cobalt ions is high appears so that cobalt hydroxide is deposited alone. It is to be noted that the lower limit of the ratio $\rho/(d \times v)$ is not particularly limited, but is preferably $0.01 \times 10^{-4}$ mol/cm$^2$ or higher because a decrease in the supply rate $\rho$ reduces productivity.

Here, when the aqueous cobalt salt solution is supplied as a fluid having a given shape from a supply port opposed to the liquid surface of the suspension and the supply port has a small cross section, the area of the contact portion with the aqueous cobalt salt, solution, that is, the area of a portion where the supply floe of the aqueous cobalt salt solution comes into contact with the liquid surface of the suspension corresponds with the project area of the supply port projected onto the liquid surface of the suspension. Therefore, when the supply port for supplying the aqueous cobalt salt solution is small, the area of the contact portion with the aqueous cobalt salt solution may be regarded as the project area of the supply port onto the liquid surface of the suspension. On the other hand, when the supply port for supplying the aqueous cobalt salt solution is large, the flow velocity of the aqueous cobalt salt solution in the supply port is usually low and therefore it is impossible to uniformly supply the aqueous cobalt salt solution from the supply port and it is difficult to control the area of the contact portion with the aqueous cobalt salt solution.

For this reason, in order to supply the aqueous cobalt salt solution from the supply port as a fluid having a stable shape, the project area of the supply port onto the liquid surface of the suspension is preferably small, and more specifically, the cross-sectional area of the supply port is preferably 0.01 to 1.0 cm$^2$. If the cross-sectional area of the supply port for supplying the aqueous cobalt salt solution is less than 0.01 cm$^2$, the supply rate of the aqueous cobalt salt solution is low, and therefore sufficient productivity cannot be achieved. On the other hand, if the cross-sectional area of the supply port exceeds 1.0 cm$^2$, there is a case where the aqueous cobalt salt solution is not sufficiently diffused because it is difficult to uniformly supply the aqueous cobalt salt solution from the supply port or the amount of the aqueous cobalt salt solution supplied varies even within the project area of the supply port onto the liquid surface of the suspension and the aqueous cobalt salt solution is likely to be intensively supplied to a particular portion.

It is to be noted that when the aqueous cobalt salt solution is supplied by spraying or diffusing it onto the liquid surface of the suspension by using a liquid diffusing means, such as a spray nozzle, provided at the supply port, the area of the contact portion with the aqueous cobalt salt solution can be regarded as the area of a region in which the aqueous cobalt salt solution is sprayed or diffused onto the liquid surface of the suspension.

Alternatively, two or more supply ports stay be provided to increase the total account of the aqueous cobalt salt solution supplied to improve productivity as long as, as described above, the aqueous cobalt salt solution can uniformly be supplied onto the liquid surface of the suspension from the supply ports. The number of supply ports is not particularly limited, and can be determined in consideration of the supply rate of the aqueous cobalt salt solution supplied from each of the supply ports or the product of the supply width of the aqueous cobalt salt solution and the flow velocity of the suspension.

Also when the pH of the suspension rapidly increases in the supply position of the aqueous cobalt salt solution, the upper limit of the concentration at which cobalt hydroxide is not deposited alone is reduced in such a high pH area, which makes it easy for cobalt hydroxide to be deposited alone. Its a result, cobalt hydroxide is started to be deposited alone even when nickel hydroxide particles are not present near the cobalt hydroxide. Such cobalt hydroxide poor in adhesiveness and uniformity is likely to adhere to the surface of nickel hydroxide particles. In order to so/old this, it is preferred that the aqueous alkali solution supplied concurrently with the aqueous cobalt salt solution is diffused at a sufficiently high speed to suppress the formation of a high pH area due to a rapid increase in the concentration of the aqueous alkali solution.

For example, if the supply rate of the cobalt salt onto the liquid surface of the suspension per unit area exceeds 0.01 mol/cm$^2$-min even when the flow velocity of the suspension is sufficiently high, a reaction is caused due to contact between a high pH area and the aqueous cobalt salt solution before the aqueous alkali solution is sufficiently diffused in the suspension when the distance between the supply position of the aqueous cobalt salt solution added and the supply position of the aqueous alkali solution added is short. In this case, there is a high possibility that cobalt hydroxide poor in adhesiveness and uniformity is deposited.

In order to avoid this, the ratio of a separation distance D (cm) between the supply positron of the aqueous cobalt salt solution and the supply position of the aqueous alkali solution to the ratio of the supply rate $\rho$ of the cobalt salt to the product of the supply width d of the aqueous cobalt, salt solution and the flow velocity v of the suspension $\{\rho/(d \times v)\}$, that is, $D/\{\rho/(d \times v)\}$ is preferably $0.5 \times 10^5$ cm$^3$/mol or more, more preferably $1.0 \times 10^5$ cm$^3$/mol or more, it is to be noted that the upper limit of the ratio D/{ρ/(d×v)} is not particularly limited, but is limited by the supply rate (ρ) or the slue of a reaction tank and is therefore about $100 \times 10^5$ cm$^3$/mol.

Here, nickel hydroxide used as a core material to be coated with cobalt hydroxide may be one well known as a cathode active material for alkaline secondary battery, but is particularly preferably a nickel compound represented by the following general formula: $Ni_{1-x-y}Co_xM_y(OH)_2$, wherein x is 0.005 to 0.05, y is 0.005 to 0.05, and M is at least one of Ca, Mg, and Zn.

If x, which represents a cobalt content, in the above general formula is less than 0.005, the effect of improving charge efficiency achieved by adding cobalt cannot be obtained. On the other hand, if x in the above general formula exceeds 0.05, battery performance is degraded due to a reduction in discharge voltage. If y, which represents the amount of M contained as an additive element, in the above general formula is less than 0.005, the effect of reducing a change in the volume of nickel hydroxide during discharge and charge achieved by adding the element M cannot be obtained. On the other hand, if y in the above general formula exceeds 0.05, the effect of reducing a change in the volume of nickel hydroxide can be obtained but a reduction in battery capacity is caused so that battery performance is undesirably degraded.

Hereinbelow, the method for producing a cobalt hydroxide-coated nickel hydroxide powder according to the embodiment of the present invention will be described more specifically. It is to be noted that the production method according to the embodiment of the present invention can achieve an improvement in productivity when carried out in a continuous scanner. However, from the viewpoint of forming a uniform coating on nickel hydroxide particles, the production method according to the embodiment of the present invention is preferably carried cut in a batch manner. Therefore, the production method according to the embodiment of the present invention will be described below with reference to a case where it is carried out in a batch manner.

First, a suspension of a nickel hydroxide powder, an aqueous solution of a cobalt salt, and an aqueous solution of an alkali are prepared. The nickel hydroxide powder as a core material preferably has an average particle sire of 6 to 12 μm so that when it is used as a cathode material in a battery, the battery can achieve excellent battery characteristics. The concentration of nickel hydroxide contained in the suspension is preferably 400 to 1200 g/L, if the concentration of nickel hydroxide is less than 400 g/L, there is a case where cobalt hydroxide is deposited alone in the suspension due to the lack of surface active sites of nickel hydroxide particles where deposition of cobalt hydroxide occurs. On the other hand, if the concentration of nickel hydroxide exceeds 1200 g/L, there is a case chore the suspension cannot be sufficiently stirred cue to an increase in its viscosity so that a non-uniform cobalt hydroxide coating may be formed.

The cobalt salt is not particularly limited as long as it is a water-soluble cobalt compound that can generate cobalt hydroxide by pH control. Here specifically, the cobalt salt is preferably cobalt sol fate or cobalt chloride, more preferably cobalt sulfate free from contamination with halogens. The alkali is not particularly limited, but is preferably water-soluble sodium hydroxide or potassium hydroxide, and is particularly preferably sodium hydroxide from the viewpoint of costs.

The suspension of the nickel hydroxide powder is preferably prepared by dispersing nickel hydroxide particles in pure water or the like to prevent impurity incorporation. The aqueous cobalt salt solution and the aqueous alkali solution are also preferably prepared by dissolving a cobalt salt or an alkali in pure water, respectively, it is to be noted that the concentrations of the aqueous cobalt salt solution and the aqueous alkali solution are not particularly limited as long as they can be controlled so that redeposition does not occur in tubes and the like of an apparatus and a problem is not caused even when the concentration of nickel hydroxide in the suspension varies, and an aqueous cobalt salt solution and an aqueous alkali solution having predetermined concentrations that depend on, for example, the concentration of the suspension can be as used.

In the case of such a batch-type production method, the aqueous cobalt salt solution for forming a coating layer and the aqueous alkali solution are continuously supplied to a reaction tank in which the suspension of the nickel hydroxide powder as a core material is stirred. This makes it possible to coat the surface of nickel hydroxide particles with cobalt hydroxide crystallized cut by neutralization to produce a cobalt hydroxide-coated nickel hydroxide powder. The reaction tank used in the batch-type production method is not particularly limited, but preferably has a stirring apparatus sure a liquid temperature-regulating mechanism to uniformly coat the surface of nickel hydroxide powder particles.

The aqueous cobalt salt solution sod the aqueous alkali solution need to be supplied separately, but may be supplied at the same time. Alternatively, the aqueous cobalt salt solution, the aqueous alkali solution, and part of the suspension may be supplied to the remaining suspension placed in the reaction tank. However, when all these liquids are previously mixed and supplied as a mixture to the reaction tank, there is a case where a reaction occurs in the mixture so that cobalt hydroxide is deposited alone. Further, when the aqueous cobalt salt solution and the aqueous alkali solution are neat supplied to the suspension separately, there is a case where the amount of a cobalt hydroxide coating formed on the surface of nickel hydroxide particles is not uniform among the particles.

The pH of the suspension at the time when the aqueous cobalt salt solution and the aqueous alkali solution supplied are mixed and equilibrium is attained is preferably kept at a value in the range of 8 to 11.5 as measured at 25° C., more preferably in the range of 9.5 to 10.5 as measured at 25° C. If the pH of the suspension is less than 6, the deposition rare of cobalt hydroxide is too lea and therefore productivity is reduced. On the other hand, if the pH of the suspension exceeds 11.5, there is a case where it is difficult to form an excellent coating because generated cobalt hydroxide is likely to be gelled.

The pH of the suspension, is preferably kept at a certain value in the range of 8 to 11.5 as measured at 25° C. and controlled so that its fluctuation range is within ±0.2 from the certain value. If the fluctuation range of pH exceeds the above limit, the amount of a cobalt hydroxide coating may vary. It is preferred that the pH of the suspension is continuously measured by, for example, a pH controller using a glass electrode method and the flow rate of the aqueous alkali solution is continuously feedback-controlled by the pH controller so that the pH is kept constant within the above fluctuation range.

The temperature of the suspension is preferably in the range of 30 to 60° C. before and after the addition of the aqueous cobalt salt, solution and the aqueous alkali solution. If the temperature of the suspension is less than 30° C., cobalt hydroxide is slowly deposited due to a low reaction rate. On the other hand, if the temperature of the suspension exceeds 60° C., cobalt hydroxide is likely to be non-uniformly deposited on the surface of nickel hydroxide particles due to too high a reaction rate. Further, the temperature of the suspension is preferably kept at a certain value within the above temperature range and controlled so that its fluctuation range is within ±1° C. from she certain value. If the fluctuation range of the temperature exceeds the above limit, the resulting nickel hydroxide powder may not achieve stable characteristics when used in a battery because the concentration of impurities in deposited cobalt hydroxide varies.

The product ion method according to the embodiment of the present invent ion makes it possible to obtain a nickel hydroxide powder whose part roles have a uniform cobalt hydroxide coating layer tightly adhering to the surface thereof. Further, in the method according to the embodiment of the present invention, the cobalt hydroxide coating layer may be oxidized to cobalt oxyhydroxide by, for example, supplying air or oxygen or adding an oxidizing agent to the suspension with stirring after the surface of nickel hydroxide particles is coated with cobalt hydroxide in the suspension in such a manner as described above.

A coated nickel hydroxide powder according to an embodiment of the present invention has a coating layer made of cobalt hydroxide or cobalt oxyhydroxide. The amount of cobalt contained in the coating layer is preferably in the range of 3 to 7 mass % with respect to the total mass of nickel hydroxide particles as a core material and the coating layer. If the amount of cobalt contained in the coating layer is less than 3 mass %, the effect obtained by coating the surface of nickel hydroxide particles is not sufficiently exerted because the amount of a cobalt compound coating is not sufficient. On the other hand, if the amount of cobalt contained in the coating layer exceeds 7 mass %, the amount of a cobalt compound coating is increased but the effect obtained by coating the surface of nickel hydroxide particles is not further enhanced.

The nickel hydroxide powder coated with a cobalt compound according to the embodiment of the present invention is excellent in the uniformity and adhesiveness of the cobalt compound coating layer formed on the surface of nickel hydroxide particles. Such excellent uniformity and adhesiveness of the cobalt compound coating layer makes it possible to reduce the amount of the cobalt compound coat lag layer peeled off by shaking a mixture, obtained by mixing 20 g of the coated nickel hydroxide powder and 50 mL of water in a closed container, with the use of a shaker mixer for 1 hour to 20 mass % or less with respect the total coating amount of the cobalt compound coating layer. If the amount of the cobalt compound coating layer peeled off exceeds 20 mass %, there is a case where the viscosity of a paste becomes unstable by the cobalt compound peeled off during the production of the paste.

As described above, by reducing the amount of the cobalt compound coating layer peeled off to 20 mass % or less with respect to the total amount of the cobalt compound coating layer, the cobalt compound coating layer is not peeled off when the coated nickel hydroxide powder is mixed with a binder or the like in the process of producing a cathode paste for alkaline secondary battery, or even when the cobalt compound coating layer is peeled off, the ratio of the cobalt compound coating layer peeled off is low, and therefore conductivity between nickel hydroxide particles in a cathode can sufficiently be ensured. Therefore, the nickel hydroxide powder according to the embodiment of the present invention is excellent as a cathode active material for alkaline secondary battery.

EXAMPLES

Example 1

6 kg of a spherical nickel hydroxide powder having an average particle size of 8 μm was placed in a reaction tank having a diameter of 25 cm and a depth of 30 cm, and water was added to the reaction tank so that a total volume was 10 liters. Then, the nickel hydroxide powder was dispersed in the water by stirring using a propeller stirrer at a rotation speed of 500 rpm to prepare a suspension of the nickel hydroxide powder.

The suspension was kept stirred, and when the flow of the suspension reached equilibrium, 2.017 liters of an aqueous cobalt sulfate solution whose cobalt sulfate concentration was 1.6 mol/L was added in 2 hours at a supply rate of 16.8 mL/min with the use of a roller pump from one supply port having a diameter of 2 mm to a supply position where the surface flow velocity of the suspension was 15.8 cm/sec. At the same time, 24 mass % aqueous sodium hydroxide solution was added from one supply port having the same inner diameter as the above-described supply port under control using a roller pump interfaced with a pH controller to that the pH of the suspension fell within the range of 10.2±0.2 as measured at 25° C. The supply positron of the aqueous sodium hydroxide solution was separated from the supply position of the aqueous cobalt sulfate solution by 15 cm, and the surface flow velocity of the suspension in the supply positron of the aqueous sodium hydroxide solution was the same as described above, that is, 15.8 cm/sec.

At this time, the ratio of the supply rate $\rho$ of a cobalt salt (cobalt sulfate) contained is the aqueous cobalt salt solution to the product of the supply width d of the aqueous cobalt salt solution supplied to the suspension and the flow velocity v of the suspension in the supply position of the aqueous cobalt sulfate solution, that is, $\rho/(d \times v)$ was $1.42 \times 10^{-4}$ mol/cm$^2$. Further, the ratio of the distance D between the supply position of the aqueous cobalt salt solution and the supply position of the aqueous alkali solution to the ratio of the supply rate $\rho$ of a cobalt salt contained in the aqueous cobalt salt solution to the product of the supply width d of the aqueous cobalt salt solution and the flow velocity v of the suspension, that is, $D/\{\rho/(d \times v)\}$ was $1.06 \times 10^3$ cm$^3$/mol. The temperature of the suspension during reaction was controlled to be 50° C.

As a result of the above operation, cobalt hydroxide was deposited on the surface of nickel hydroxide powder particles in the suspension so that a cobalt hydroxide-coated nickel hydroxide powder whose particles had a cobalt hydroxide coating layer on the surface thereof was obtained. After the total amounts of the aqueous cobalt sulfate solution and the aqueous sodium hydroxide solution were soloed in the above operation, air was blown into the resulting slurry with stirring for 4 hours to oxidize cobalt, hydroxide deposited on the surface of the nickel hydroxide particles to cobalt oxyhydroxide.

Then, the slurry was subjected to solid-liquid, separation by filter press to collect the powder, and the powder was washed with water and was again subjected to filtration. The thus obtained powder was dried at 120° C. for 20 hours by a vacuum, drier to obtain 6.3 kg of a cobalt oxyhydroxide-coated nickel hydroxide powder. The thus obtained cobalt oxyhydroxide-coated nickel hydroxide powder was dark brown. The powder was observed by SEM to evaluate the state of the cobalt oxyhydroxide coating, surd as a result, it was confirmed that, as shown in FIG. 1, the nickel hydroxide particles had a uniform coating layer.

Then, 20 g of the cobalt oxyhydroxide-coated nickel hydroxide powder and 50 ml of water were placed in a closed plastic container, and were shaken for 1 hour with the use of a shaker mixer (TURBULA Type T2C manufactured by Willy A. Bachofen (WAB)) to examine whether the cobalt oxyhydroxide coating layer was peeled off. As a result, no small pieces of the cobalt oxyhydroxide coating layer peeled off were adhered to the inner wall of the container, that is, peeling-off of the cobalt oxyhydroxide coating layer did not occur.

10 g of the cobalt oxyhydroxide-coated nickel hydroxide powder after shaking was mixed with 200 mL of pure water with stirring, and the mixture was allowed to stand to precipitate the cobalt oxyhydroxide-coated nickel hydroxide powder to separate cobalt oxyhydroxide peeled off as a supernatant. The amount of cobalt oxyhydroxide peeled off was determined by comparison of a cobalt content between the cobalt oxyhydroxide-coated nickel hydroxide powder after separation and the cobalt oxyhydroxide-coated nickel hydroxide powder before shaking, and as a result, was found to be 20 mass % or less with, respect to the total amount of the cobalt oxyhydroxide coating.

Example 2

A reaction tank having a diameter of 84 cm and a depth of 100 cm was used, and 240 kg of the same nickel hydroxide powder as used in Example 1 was placed in the reaction tank, and water was added to the reaction tank so that a total volume was 350 liters. Then, the nickel hydroxide powder was dispersed in the water by stirring using a propeller stirrer at a rotation speed of 350 rpm to prepare a suspension of the nickel hydroxide powder.

An aqueous cobalt sulfate solution adjusted to a concentration of 1.6 mol/L was supplied using a roller pump from 10 supply ports each having a diameter of 2 mm at an addition rate of 67.2 ml/min per port to 10 supply positions where she surface flow velocity of the suspension was 49.7 cm/sec. In this way, 80.7 liters of the aqueous cobalt sulfate solution was added in 2 hours. At the same time, a 24 mass % aqueous sodium hydroxide solution was added from one supply port under control using a roller pump interfaced with a pH controller ac that the pH of the suspension fell within the range of 10.2±0.2 as measured at 25° C. The supply position of the aqueous sodium hydroxide solution was separated from the nearest one of the 10 supply positions of the aqueous cobalt sulfate solution by 20 cm, and the surface flow velocity of the suspension in the supply position of the aqueous sodium hydroxide solution was the same as described above, that is, 49.7 cm/sec. In this way, cobalt hydroxide was deposited on the surface of nickel hydroxide particles.

At this time, the ratio of the supply rate ρ of a cobalt salt (cobalt sulfate) contained in the aqueous cobalt salt solution to the product of the supply width d of the aqueous cobalt salt solution supplied to the suspension and the flow velocity v of the suspension in each of the supply positions of the aqueous cobalt sulfate solution, that is, $\rho/(d \times v)$ was $1.80 \times 10^{-1}$ mol/cm$^2$. Further, the ratio of the distance D between the supply position of the aqueous cobalt salt solution and the supply position of the aqueous alkali solution to the ratio of the supply rate ρ of a cobalt salt contained in the aqueous cobalt salt solution to the product of the supply width d of the aqueous cobalt salt solution and the flow velocity v of the suspension, that is, $D/\{(d \times v)\}$ was $1.11 \times 10^5$ cm$^3$/mol or more. The temperature of the suspension during reaction was controlled to be 50° C.

As a result of the above operation, cobalt hydroxide was deposited on the surface of nickel hydroxide powder particles so that a cobalt hydroxide-coated nickel hydroxide powder whose particles had a cobalt hydroxide coating layer on the surface thereof was obtained. After the total amounts of the aqueous cobalt sulfate solution and the aqueous sodium hydroxide solution were added in the above operation, air was blown into the resulting slurry with stirring for 4 hours to oxidize cobalt hydroxide deposited on the surface of the nickel hydroxide particles to cobalt oxyhydroxide.

Then, the slurry was subjected to solid-liquid separation by filter press to collect the powder, and the powder was washed with water and was again subjected to filtration. The thus obtained powder was dried at 120° C. for 20 hours by a vacuum drier to obtain 252 kg of a cobalt oxyhydroxide-coated nickel hydroxide powder. The thus obtained cobalt oxyhydroxide-coated nickel hydroxide powder was dark brown.

The powder was observed by SEM to evaluate the coating state of the cobalt oxyhydroxide coating layer, and as a result, it was confirmed that, as in the case of Example 1, the nickel hydroxide particles were uniformly coated with cobalt oxyhydroxide. Further, the cobalt oxyhydroxide-coated nickel hydroxide powder was shaken in the same manner as in Example 1, but peeling-off of cobalt oxyhydroxide caused by shaking was not observed, and the amount of cobalt hydroxide peeled off was 20 mass % or less with respect to the total amount of the cobalt oxyhydroxide coating.

Example 3

A reaction tank having a diameter of 190 cm and a depth of 220 cm was used, and 2380 kg of the same nickel hydroxide powder as used in Example 1 was placed in the reaction tank, and water was added to the reaction tank so that a total volume was 3000 liters. Thorp the nickel hydroxide powder was dispersed in the water by stirring using a propeller stirrer at a rotation speed of 150 rpm to prepare a suspension of the nickel hydroxide powder.

968.3 liters of an aqueous cobalt sulfate solution adjusted to a concentration of 1.6 mol/L was added in two hours using a roller pump from 2 spray nozzles at an addition rate of 4035 ml/min per nestle so as to be sprayed onto the liquid surface of the suspension in a circular pattern having a diameter of 500 mm so that the center of the spray pattern uses located in a position where the surface flow velocity of the suspension was 126.5 cm/sec. At the same time, a 24 mass % aqueous sodium hydroxide solution was added from one supply port under control using a roller pump interfaced with a pH controller so that the pH of the suspension fell within the range of 10.2±0.2 as measured at 25° C. The supply position of the aqueous sodium hydroxide solution was separated from the end of the spray pattern of the nearest one of the 2 supply positions of the aqueous cobalt sulfate solution by 20 cm, and the surface flow velocity of the suspension in the supply position of the aqueous sodium hydroxide solution was the same as described above, that is, 126.5 cm/sec. In this way, cobalt hydroxide was deposited on the surface of nickel hydroxide particles.

At this time, the ratio of the supply rate ρ of a cobalt salt (cobalt sulfate) contained in the aqueous cobalt salt solution to the product of the supply width d of the aqueous cobalt salt solution supplied to the suspension and the flow velocity v of the suspension in each of the supply positions of the aqueous cobalt sulfate solution, that is, $\rho/(d \times v)$ was $1.70 \times 10^{-5}$ mol/cm$^2$. Further, the ratio of the distance D between the supply position of the aqueous cobalt salt solution and the supply position of the aqueous alkali solution to the ratio of the supply rate ρ of a cobalt salt contained in the aqueous cobalt salt solution to the product of the supply width d of the aqueous cobalt salt solution and the flow velocity v of the suspension, that is, $D/\{\rho/(d \times v)\}$ was $11.8 \times 10^5$ cm$^3$/mol or more. The temperature of the suspension during reaction was controlled to be 50° C.

As a result of the above operation, cobalt hydroxide was deposited on the surface of nickel hydroxide powder particles so that a cobalt hydroxide-coated nickel hydroxide powder whose particles had a cobalt hydroxide coating layer on the surface thereof was obtained. After the total amounts of the aqueous cobalt sulfate solution and the aqueous sodium ever oxide solution were added in the above operation, air was blown into the resulting slurry with stirring for 4 hours to oxidize cobalt hydroxide deposited on the surface of the nickel hydroxide particles to cobalt oxyhydroxide.

Then, the slurry was subjected to solid-liquid separation by filter press to collect the powder, and the powder was washed with water and was again subjected to filtration. The thus obtained powder was dried at 120° C. for 20 hours by a vacuum drier to obtain 3165 kg of a cobalt oxyhydroxide-coated nickel hydroxide powder. The thus obtained cobalt oxyhydroxide-coated nickel hydroxide powder was dark brown.

The powder was observed, by SEM to evaluate the coating state of the cobalt oxyhydroxide coating layer, and as a result, it was confirmed that, as in the case of example 1, the nickel hydroxide particles were uniformly coated with cobalt oxyhydroxide. Further, the cobalt oxyhydroxide-coated nickel hydroxide powder was shaken in the same manner as in Example 1, but peeling-off of cobalt oxyhydroxide caused by shaking was not observed, and the amount of cobalt hydroxide peeled off was 20 mass % or less with respect to the total amount of the cobalt oxyhydroxide coating.

Comparative Example 1

A cobalt hydroxide-coated nickel hydroxide powder was obtained in the same manner as in Example 1 except that the rotation speed of the propeller stirrer was changed to 300 rpm so that the surface flow velocity of the suspension in the supply positions where the aqueous cobalt sulfate solution surd the aqueous sodium hydroxide solution were added was 5 cm/sec. Then, the cobalt hydroxide-coated nickel hydroxide powder was converted to a cobalt oxyhydroxide-coated nickel hydroxide powder by oxidation of cobalt hydroxide.

At this time, the ratio of the supply rate $\rho$ of a cobalt salt contained in the aqueous cobalt salt solution to the product of the supply width d of the aqueous cobalt salt solution supplied to the suspension and the flow velocity v of the suspension in the supply position of the aqueous cobalt sulfate solution, that is, $\rho/(d \times v)$ was $4.48 \times 10^{-4}$ mol/cm$^2$. Further, the ratio of the distance D between the supply position of the aqueous cobalt salt solution and the supply position of the aqueous alkali solution to the ratio of the supply rate $\rho$ of a cobalt salt contained in the aqueous cobalt salt solution to the product of the supply width d of the aqueous cobalt salt solution and the flow velocity v of the suspension, that is, $D/\{\rho/(d \times v)\}$ was $0.335 \times 10^5$ cm$^3$/mol. The temperature of the suspension during reaction was controlled to be 50° C.

After the total amounts of the aqueous cobalt sulfate solution and the aqueous sodium hydroxide solution were added in the above operation, as in the case of Example 1, air was blown into the resulting slurry with stirring for 4 hours to oxidize cobalt hydroxide deposited on the surface of nickel hydroxide particles to cobalt oxyhydroxide. The thus obtained powder was washed, filtered, and dried in the same manner as in Example 1 to obtain a cobalt oxyhydroxide-coated nickel hydroxide powder. The thus obtained cobalt oxyhydroxide-coated nickel hydroxide powder was dark brown.

Figure 2:
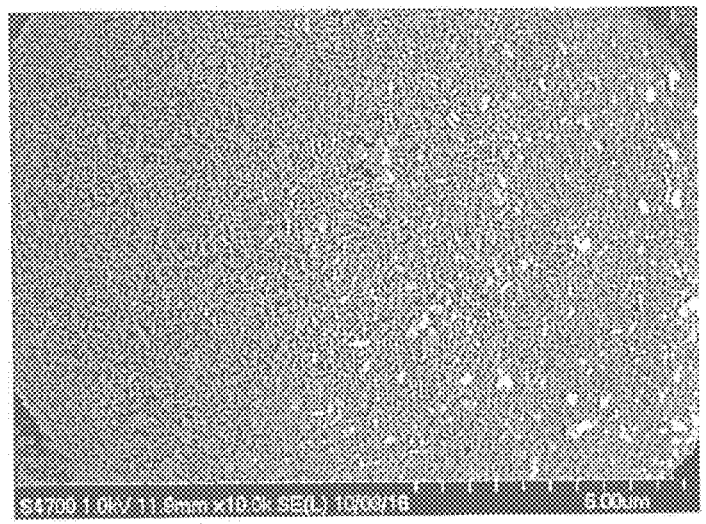
FIG. 2 is an SEM photograph of a cobalt oxyhydroxide-coated nickel, hydroxide powder prefaced in Comparative Example 1.

The powder was observed by SEM to evaluate the coating state of the cobalt oxyhydroxide coating layer, and as a result, as shown in FIG. 2, cobalt oxyhydroxide scales were observed in some positions on the surface of the powder, and therefore it was confirmed that the nickel hydroxide particles were non-uniformly coated. Further, the cobalt oxyhydroxide-coated nickel hydroxide powder was shaken in the same manner as Example 1, and as a result, small dark brown particles adhered to the inner wall of the plastic container. The adhered particles were analyzed by a EDX, and as a result, it was confirmed that cobalt oxyhydroxide of the cobalt oxyhydroxide coating layer had been peeled off. The amount of cobalt oxyhydroxide peeled off was 22 mass % with respect to the total amount of the cobalt oxyhydroxide coating.

Comparative Example 2

A cobalt oxyhydroxide-coated nickel hydroxide powder was obtained in the same manner as in Example 2 except that the aqueous cobalt sulfate solution was added using a roller pump in two hours at an addition rate of 672.4 mL/min from one supply port having a diameter of 8 mm. Then, cobalt hydroxide deposited on the surface of nickel hydroxide particles was oxidized to cobalt oxyhydroxide.

At this time, the ratio of the supply rate $\rho$ of a cobalt salt contained in the aqueous cobalt salt solution to the product of the supply width d of the aqueous cobalt salt solution supplied to the suspension and the flow velocity v of the suspension in the supply position of the aqueous cobalt sulfate solution, that is, $\rho/(d \times v)$ was $4.51 \times 10^{-1}$ mol/cm$^2$. Further, the ratio of the distance D between the supply position of the aqueous cobalt salt solution and the supply position of the aqueous alkali solution to the ratio of the supply rate $\rho$ of a cobalt salt contained in the aqueous cobalt salt solution to the product of the supply width d of the aqueous cobalt salt solution and the flow velocity v of the suspension, that is. $D/\{\rho/(d \times v)\}$ was $0.443 \times 10^5$ cm$^3$/mol. The temperature of the suspension during reaction was controlled to be 50° C.

The thus obtained cobalt oxyhydroxide-coated nickel hydroxide powder was dark brown. The powder was evaluated in the same manner as in Example 1, and as a result, as in the case of Comparative Example 1, cobalt oxyhydroxide scales were observed in some positions on the surface of the powder. From the result, it was confirmed that the nickel hydroxide particles were non-uniformly coated wife cobalt oxyhydroxide. Further, the powder was shaken in the same manner as in Example 1, and as a result, small dark brown particles adhered to the inner wall of the plastic container. The adhered particles were analyzed by EDX, and as a result, it was confirmed that cobalt oxyhydroxide of the cobalt oxyhydroxide coating layer had been peeled off. The amount of cobalt oxyhydroxide peeled off was 25 mass % with respect, to the total amount of the cobalt oxyhydroxide coating.

The embodiment of the coated nickel hydroxide powder and the embodiment of the method for producing the same according to the present invention have been described above with reference to the examples. However, the present invention is not limited to these examples and embodiments, and can be embodied in various forms without departing from the scope of the invention. The technical scope or the present invention is defined by the appended claims and their equivalents. This application is based on Japanese Patent Application No. 2011-098968 filed on Apr. 23, 2011, the disclosed contests thereof are incorporated herein by reference.

What is claimed is:

1. A coated nickel hydroxide powder as a cathode active material for an alkaline secondary battery, said coated nickel hydroxide powder comprising nickel hydroxide powder particles having a coating layer made of a cobalt compound on a surface thereof, wherein when 20 g of the coated nickel hydroxide powder particles and 50 ml of water placed in a closed container are shaken by a shaker mixer for 1 hour, an amount of the cobalt compound coating layer peeled off is 20 mass % or less of a total amount of the cobalt compound coating, said nickel hydroxide powder particles being represented by a general formula of $Ni_{1-x-y}Co_xM_y(OH)_2$, where x is 0.005 to 0.05, y is 0.005 to 0.05, and M is at least one of Ca, Mg, and Zn.

2. The coated nickel hydroxide powder according to claim 1, wherein the cobalt compound constituting the cobalt compound coating layer is at least cobalt hydroxide or cobalt oxyhydroxide.

* * * * *